Oct. 20, 1970   L. F. PAHL ET AL   3,534,944
CARBONATING SYSTEM
Filed Feb. 13, 1968   2 Sheets-Sheet 1
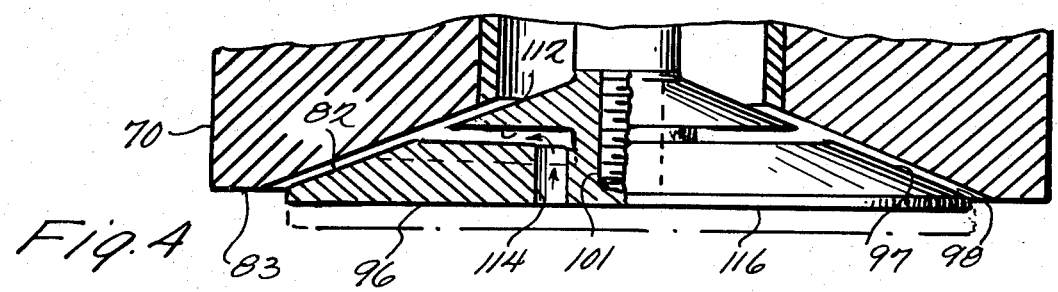
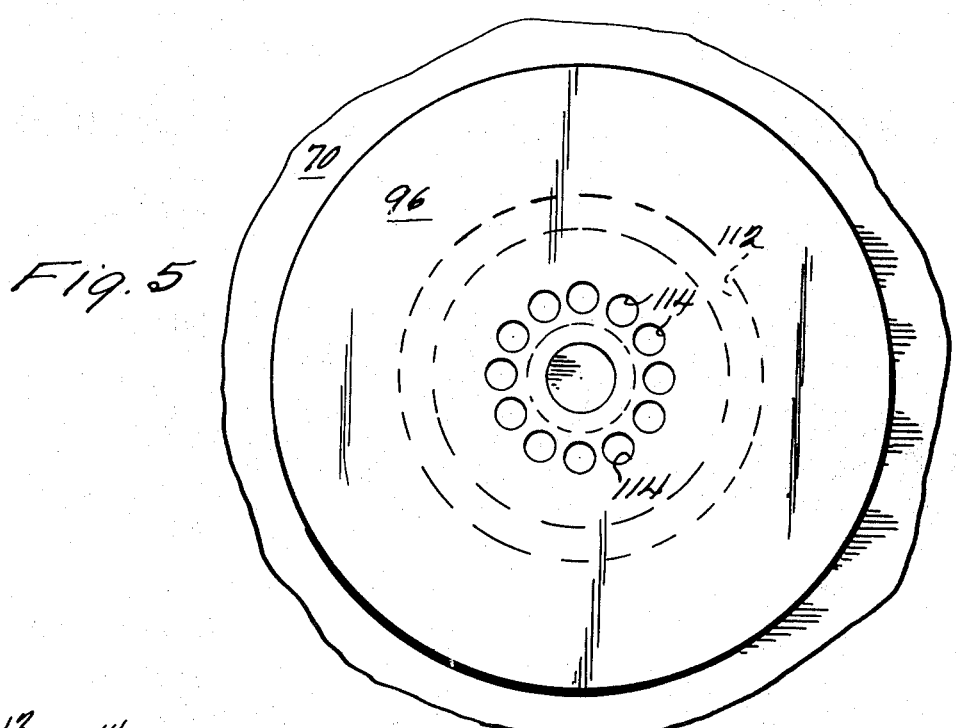
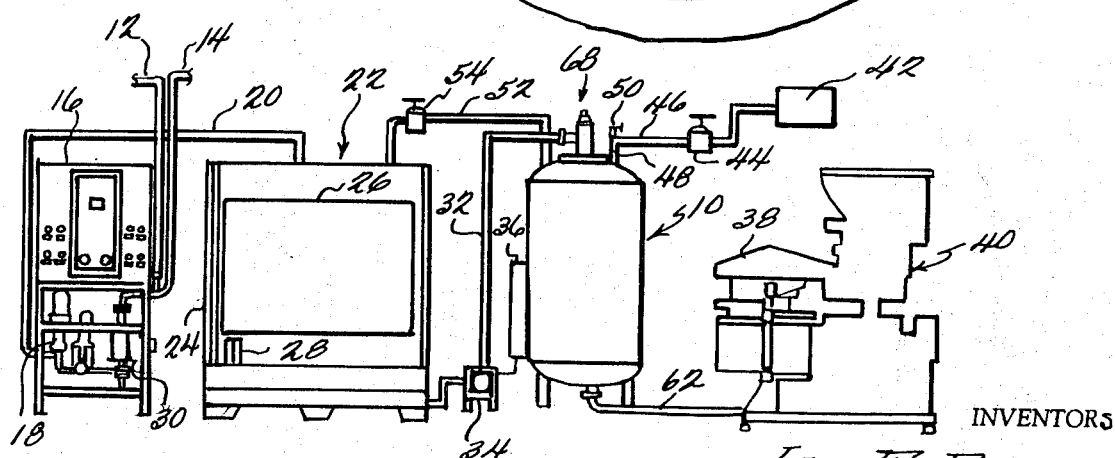
INVENTORS
LEO F. PAHL
NORMAN H. JONES
BY Cushman, Darby & Cushman
ATTORNEYS

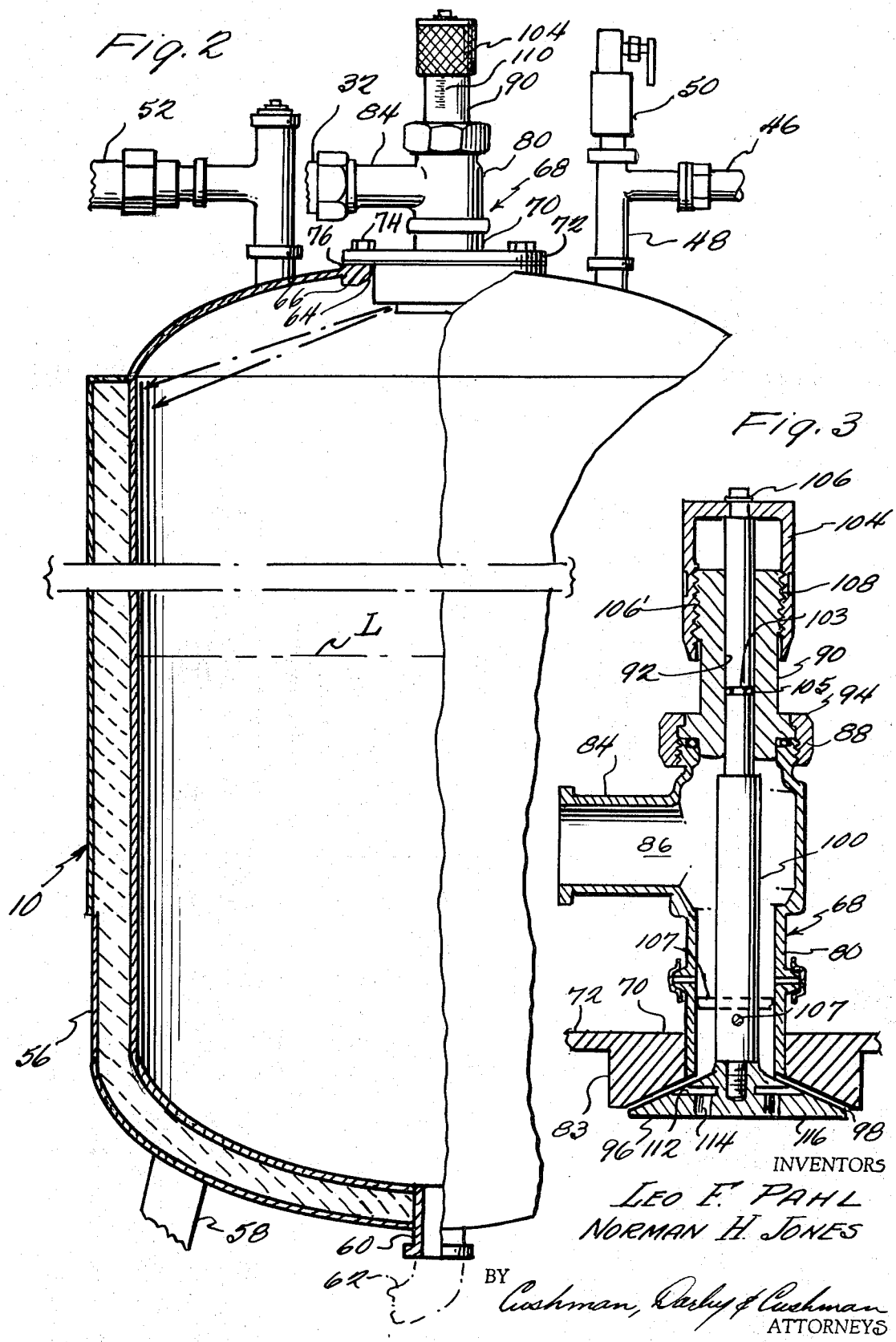

United States Patent Office 3,534,944
Patented Oct. 20, 1970

3,534,944
CARBONATING SYSTEM
Leo F. Pahl, Pasadena, and Norman H. Jones, Baltimore, Md., assignors to Crown Cork & Seal Company, Inc., Philadelphia, Pa., a corporation of New York
Filed Feb. 13, 1968, Ser. No. 705,164
Int. Cl. B05b 7/12, 7/24
U.S. Cl. 261—62                                    9 Claims

ABSTRACT OF THE DISCLOSURE

A carbonating apparatus for carbonating or saturating a liquid, preferably a blend of syrup and water, with a predetermined volume of carbon dioxide gas. The carbonating apparatus, which may include a closed tank with or without the plurality of vertically spaced film plates, is provided with a nozzle injector assembly in the upper portion thereof for injecting carbon dioxide gas directly into the stream of liquid flowing into the tank. The nozzle injector assembly is provided with means for adjustably controlling the velocity of the liquid passing through the assembly thereby controlling the amount of gas injected into the liquid, the apparatus also utilizing the control of the pressure of gas within the tank and temperature of the gas and liquid to control the dissolving of the gas into the liquid.

---

The present invention relates to an improved carbonating apparatus for effecting the saturation of a liquid with carbon dioxide gas. While the carbonating apparatus is preferably used with premixed liquids of water and syrup for eventual use as a carbonated beverage, it may also be used in systems wherein just water is carbonated with the syrup subsequently added during the bottling of the carbonated beverage.

It is a well known fact that the water of carbonated beverages has a rather marked affinity for carbon dioxide gas and will absorb the same to a certain degree whenever the surface of a body of the water is brought into contact with a relatively pure atmosphere of the gas. Additionally, it is well known that the degree of ultimate absorption also depends upon the temperature of the liquid and gas and also on the pressure under which the gas and water are brought into contact with one another. Heretofore, the usual method and apparatus for carbonating liquids included means for flowing the liquid over film plates in a labyrinth path in an atmosphere of carbon dioxide, the increasing of the length of the labyrinth path increasing the absorption of gas at a given pressure. Also, while apparatus of this character have been heretofore commercially used for carbonating water prior to the mixing of the water with a syrup, they have not been entirely satisfactory in use when utilizing a premixed liquid of syrup and water as the pressures of gas within the apparatus had to be increased unreasonably high in order to provide proper absorption of the gas with the water. An additional disadvantage of this apparatus when carbonating a pre-mix liquid was that the volume of liquid carbonated per unit of time had to be decreased as the liquid had to be in contact with the gas a longer period of time to obtain proper absorption.

Some efforts have been made in the past to inject carbon dioxide gas directly into the liquid flowing into a carbonator tank but these apparatus had limited capability as the injectors were fixed and thus the apparatus did not have utility in adapting to various types of liquids requiring different volumes of absorption. Additionally, such prior carbonators utilizing an injection principle had to inject the carbon dioxide gas at such high pressures that it resulted in agitation of the product thus producing unstable filling of the containers.

An object of the present invention is to provide an improved carbonating apparatus in which the amount of carbonation or saturation of liquid may be easily controlled and adjusted for various types of liquid. Due to the wide variety of flavors, bouquets and characteristics of liquids to be carbonated, there is no such thing as a "standard" volume of carbonation applicable to all such liquids. The improved apparatus of the present invention provides for an efficient and quick means which may be adjusted for various beverages which will result in the most rapid type of carbonation for the particular beverage.

Ancillary to the above object, it is a further object of the present invention to provide a carbonating apparatus which may be accurately adjusted for predetermined amounts of carbonation required by different products, the control being such that when the apparatus is switched back for use with a particular product, the results are uniform.

Another object of the present invention is to privide an apparatus which utilizes carbon dioxide gas at lower pressures for carbonating the liquid to the same degree as previous apparatus and at a more rapid rate of carbonation without unduly effecting or producing an unstable carbonated liquid.

Still another object of the present invention is to provide an improved injector nozzle assembly for a carbonator capable of being easily adjusted for a particular degree of carbonation, the nozzle assembly also being capable of use with premixed liquids of water and syrup without clogging.

A further object of the present invention is to provide an improved carbonator which is more efficient, simpler to manufacture, and lower in cost in manufacturing the previous carbonators yet having more utility for use with different types of liquids, such as beverages.

Ancillary to the immediately preceding object it is still another object of the present invention to provide a carbonator in which the control of the efficiency of carbonation is directly in the carbonator tank when other factors of carbonation remain constant.

These and other objects and advantages of the persent invention will appear more fully in the following specification, claims and drawings in which:

FIG. 1 is a diagrammatic view of a typical bottling system utilizing the carbonating apparatus of the present invention;

FIG. 2 is a fragmentary side elevational view, partly in vertical cross section, of the carbonating apparatus of the present invention;

FIG. 3 is an enlarged vertical sectional view through the injector nozzle assembly of the carbonating apparatus of FIG. 2;

FIG. 4 is an enlarged fragmentary sectional view of the lower portion of the injection nozzle of FIG. 3, and FIG. 5 is a bottom plan view of the injector nozzle assembly of FIG. 4.

Referring now to the drawings wherein like character or reference numerals represent like or similar parts, the carbonating apparatus of the present invention generally designated by the numeral 10 is shown in FIG. 1 in a typical filling system. In more detail, the filling system disclosed is what is known in the art as a "premix" system, the water and syrup being separately fed by conduits 12 and 14 respectively to a blending apparatus 16 wherein proportionate amounts of the water and syrup are blended. The premixed liquid is discharged from the blending apparatus 16 as needed by a modulating valve 18 through a conduit 20 to a cooling apparatus 22. The cooling apparatus comprises a tank 24 having a plurality of cooling plates 26 therein over which the premix liquid is flowed in an atmosphere of air and carbon dioxide at approximately one-half to one pound per square inch pressure. As the premix liquid flows down the plates 26, it is cooled and, since it is in contact with a mixture of carbon dioxide and air, it does absorb some carbon dioxide, thus, it can be considered that it is partially carbonated. If desired, the liquid, prior to entering the cooling apparatus 22, may be passed through deaerating apparatus which by use of a vacuum removes the air therefrom. The bottom of the tank 24 provides a reservoir for the cooled liquid, the same carrying a predetermined amount of liquid therein and when the level of liquid drops below a predetermined level, the electrical high-low level control 28, which is operatively connected to the modulating valve 18 and to the proportioning unit 30 (not shown) operates the same to cause the premix liquid to flow from the blending apparatus 16 into the top of the cooler.

The cooling apparatus 22 in turn supplies cooled premixed liquid to the carbonating apparatus 10 through a conduit 32, the conduit 32 having a transfer pump 34 therein connected to a level control device 36 on the carbonating apparatus 10. As will now be obvious, when the level of liquid within the carbonating apparatus 10 drops below a predetermined amount indicating that the apparatus needs a further liquid supply, the pump 34 is started to pump liquid into the apparatus from the cooling apparatus. From the carbonating apparatus 10, the carbonated liquid is then transferred to the reservoir 38 of a filling machine 40, the liquid being subsequently flowed from the reservoir into containers.

Carbonating apparatus 10 is supplied with carbon dioxide gas from a suitable source 42 through a pressure regulator 44, the carbon dioxide gas flowing into the upper portion of the tank through a conduit 46 which terminates in a T connection 48 having one branch connected to the top of the carbonating apparatus 10 and the other branch provided with a safety valve 50 set to relieve pressure when pressure in the carbonating apparatus rises above a predetermined level greater than the normal operating levels for various products. The pressure of carbon dioxide gas in the carbonating apparatus 10 is controlled by the regulator 44 and is usually set to a desired predetermined pressure between 20 and 60 pounds per square inch depending upon the type of end product being dispensed by the filling machine. The carbon dioxide gas for the cooling apparatus 22 is bled off of the top of the carbonating apparatus 10 through a conduit 52 into the top of the cooling apparatus 22. A pressure regulator 54 is provided in the conduit 52 and this is usually set to deliver gas to the cooling apparatus at a pressure of between one-half and one pound per square inch.

Referring now specifically to FIGS. 2 through 5 inclusive, the carbonating apparatus 10 is usually in the form of a generally cylindrical pressure-tight tank 56 supported on suitable legs 58 and having an outlet 60 at its bottom. The outlet 60 has a conduit 62 connected thereto which extends to a filling machine 40 and it is through this conduit that the carbonated liquid is supplied to the reservoir 38 of the filling machine upon demand of the filling machine.

The upper portion of the tank 56 is provided with a circular opening 64, the tank being provided with a reenforcing ring 66 around the opening. An injector nozzle assembly, generally designated at 68, is supported in the opening 64, the assembly 68 being provided with a body member 70 having a flange 72 for cooperation with the ring 66. In more detail, the flange 72 is bolted to the ring 66 by bolts 74, there being a cover gasket 76 provided between the flange and the ring.

The body 70 is provided with a tubular portion 80 that opens at its lower end to a conical shaped wall or surface 82 on a portion 83 of the body member 70 which extends slightly into the upper portion of the tank 56. A tubular branch 84 of the body member 70 extends off of the upwardly extending tubular portion 80, the branch 84 providing a means for connection of the conduit 32 from cooling apparatus 22. Thus, it will be seen the nozzle body member 70 is provided with a liquid passage 86 therethrough which terminates at the discharge end thereof in the conical shaped surface or wall 82.

The upper end of the tubular portion 80 is exteriorly threaded at 88 and an extension member 90 having a bore 92 therethrough is secured in position on the body member 70 by means of a ring nut 94.

A nozzle head member 96, which is conical in shape to provide a wall 97 complementary to the conical shaped wall 82, cooperates with the wall 82 to define a diverging restricted discharge passage 98 (FIG. 4) for the liquid to be carbonated. The conical shaped head member 96 is provided with an upwardly extending stem member 100 suitably secured thereto by a stud 101 on its end, the stem member 100 extending through the bore 92 and out of the extension 90.

A groove 103 is provided on the portion of the stem member 100 extending through the bore 92, the groove receiving an O-ring 105 which provides a stem seal. Stem member 100 is provided at its upper end with a knurled cap 104, the cap being suitably fixedly secured to the stem member by a lock ring 106. Cap member 104 has internal threads 106' which cooperate with external threads 108 on the extension portion 90. The external surface of the extension portion 90 is provided with a vernier scale 110 and thus the operator, when adjusting the width of the restricted passage 98 can utilize the lower edge of the cap 104 to make such an adjustment. In order to give the stem member 100 and the head member 96 stability at the lower end of the assembly during movement of the same relative to the body member 70, the stem member 100 is provided with a plurality of radially extending guide pins 107 which ride against the wall of the passage 86 in the tubular portion 80.

In order that carbon dioxide gas can be injected into the liquid flowing into the tank, the nozzle head 96 is provided on its conical surface with an annular groove 112. A plurality of drilled passages 114 extending from the face 116 of the nozzle head 96 communicate at their inner ends with the groove 112. As will now be evident, the pump 34, when operating because the level L of liquid in the tank has dropped below a predetermined height, will pump liquid to be carbonated from the cooling apparatus 22 into the carbonator tank 56 through the nozzle injection assembly 68 against the pressure of carbon dioxide within the tank 56. When the liquid to be carbonated passes through the restricted passage 98, the velocity of flow of the liquid will be increased over that of the flow of liquid in the passage 86 up to the restriction and, consequently, there will be a pressure drop in the restricted passage 98 thus causing carbon dioxide gas to be drawn from the top portion interior of the tank 56 through the drilled passages 114, the carbon dioxide gas being injected into the stream of liquid from the annular groove 112. By providing an annular groove 112 rather than individual drilled passageways at the area of discharge of the carbon dioxide gas into the liquid, the carbon dioxide gas is discharged into the liquid stream completely around the annulus of the stream so as to effect complete homogenization of gas into the liquid stream. This provides a more uniform absorption by the liquid.

The amount of saturation of the liquid for a given pressure of carbon dioxide gas in the tank 56 can be easily controlled by varying the cross-sectional area of the restricted passage 98. This is done by rotating the cap member 104 one way or the other to either increase or decrease the passage. If the passageway is decreased in cross-sectional area, the velocity of the liquid passing therethrough will be increased and, also, the pressure drop across the outlet of the annular groove 112 will increase. This will cause more carbon dioxide gas to be injected into the stream of liquid per unit volume of the same. Conversely, as the gap between the body member 70 and the head member 96 is increased, the velocity of the stream passing through the restricted passage 98 is decreased to lower the pressure drop and thus decrease the amount of carbon dioxide gas being injected into the stream.

The arrangement of carbonating apparatus 10 just described is considerably more efficient than the apparatus heretofore considered as a greater volume of liquid may be carbonated at considerably lower pressures within the carbonating tank. For example, the prior art carbonators operated at 30 to 90 pounds per square inch and they utilized the length of the labyrinth flow of the film plates plus the time to flow over the film plates to control the carbonating rate of approximately 2,500 gallons per hour. With the present carbonator, the same amount or better carbonation of liquid can be obtained at pressure of 20 to 60 pounds per square inch, depending on the adjustment of the nozzle injection assembly and at a rate of 3,600 gallons per hour.

It will be understood that the adjustment feature of the nozzle injection assembly 68 provides for a wide range of saturation of a liquid for a particular product. For example, if a cola product is to be carbonated, it is desirable to have about 3.5 volumes of carbon dioxide gas in the same whereas a soda water product would have anywhere from 6 to 8 volumes of carbon dioxide gas. Merely by adjusting the size of the restrictive passage 98 both of such beverages can be accommodated in this system quite easily. Also, it will be appreciated that an even wider range of carbonation can be obtained by adjusting the pressure of carbon dioxide gas within the tank 10 by use of the regulator 44. In some instances where the beverage is quite unstable, the high velocity of flow of liquid through the nozzle injection apparatus is not desirable. In these cases, the cap of the restricted passage 98 can be increased to reduce the velocity but in order to obtain the proper amount of saturation, then it would be necessary to increase the pressure of carbon dioxide gas within the tank.

The vernier scale 110 provided on the extension 90 may be calibrated for carbonation of the liquid of a particular product. Once the scale has been calibrated, the nozzle injection apparatus 68 may be easily adjusted for the particular beverage to give a uniform product when switching back and forth between different beverages.

While the tank 56 of the carbonating apparatus 10 is disclosed without the usual film plates for providing a labyrinth flow path for the liquid in the tank, it may be desirable to utilize film plates, especially where a highly unstable beverage is being handled and it is necessary to maintain the same as quiescent as possible. The use of the film plates would not only provide a gentle flow of the liquid into the carbonating tank and down to the bottom of the same but would also function to further assist in the saturation of the carbon dioxide gas into the liquid.

Although the carbonating apparatus disclosed in this application has been described in considerable detail, it must be understood that the apparatus may be modified without departing from the spirit and scope of the invention. Therefore, the terminology used in the specification is for the purpose of description and not limitation, the scope of the invention being defined in the claims.

What is claimed is:

1. A carbonating apparatus for carbonating a liquid with a predetermined volume of carbon dioxide gas comprising: a closed tank; means to supply carbon dioxide gas to the interior of said tank; means for supplying the liquid to be carbonated to the upper portion of said tank, means including a discharge nozzle assembly in said upper portion of said tank having a restricted passage therethrough opening directly into said tank for spraying the liquid into the interior of the tank, means to adjust the cross sectional area of said restricted passage for varying the velocity of the liquid flowing therethrough as a stream to a predetermined velocity, means defining a passageway through said nozzle assembly having one end opening directly into the interior of the tank and the other end opening directly into the restricted passage at a position where said restricted passage is adjusted by said adjustment means whereby carbon dioxide gas is withdrawn from the upper portion of said tank and is injected directly into the stream of liquid as it passes through the restricted pasage in a predetermined volume dependent upon the cross section of said restricted passage as provided by said adjustment means; and means for discharging the carbonated liquid from the bottom of said tank.

2. A carbonating apparatus as claimed in claim 1 in which said adjustment means for adjusting the cross-sectional area in said restricted passage in said nozzle assembly decreases the cross-sectional area of said restricted passage for increasing the velocity of the stream of liquid flowing therethrough to thereby increase the amount of carbon dioxide gas injected therein through the gas passageway in said nozzle and vice versa.

3. A carbonating apparatus as claimed in claim 1 including means to vary the pressure of carbon dioxide gas within the interior of said tank to a predetermined pressure.

4. A carbonating apparatus as claimed in claim 1 in which the liquid to be carbonated is a premixture of water and syrup.

5. A carbonating apparatus as claimed in claim 1 in which said restricted passage through said nozzle assembly is conical-shaped and discharges the carbonated liquid stream therefrom outwardly and downwardly toward the wall of said tank.

6. A carbonating apparatus for carbonating a liquid with a predetermined volume of carbon dioxide gas comprising: a closed tank; means to supply carbon dioxide gas to the interior of said tank; means for supplying liquid to be carbonated to the upper portion of said tank, said means including a discharge nozzle assembly in the upper portion of said tank having an adjustable restricted passage therethrough for spraying the liquid into the interior of the tank in a stream at a predetermined velocity, said discharge nozzle assembly comprising a nozzle body member mounted on the upper portion of said tank and having a passage therethrough for the liquid to be carbonated with a discharge end portion of the passage into the tank increasing in diameter and being conical in shape to define one wall of the restricted passage, a complementary concial-shaped nozzle head carried in the discharge end portion of the passage of said nozzle body and defining the other wall of the restricted passage, said nozzle head having a stem extending through the passage in said body and externaly of said body, and means to move said nozzle relative to said nozzle body to adjust the cross-sectional area of said restricted passage, means defining a passageway through said nozzle assembly having one end opening to the interior of the tank and the other end opening to the restricted passage therein for injecting carbon dioxide gas from the upper portion of said tank into the stream of liquid as it passes through the restricted passage; and means for discharging the carbonated liquid from the bottom of said tank.

7. A carbonating apparatus as claimed in claim 6 in which said stem of said nozzle head is provided with an adjustment nut threadedly received on said nozzle body for adjustably positioning said nozzle head relative to said nozzle body to adjust the restricted passage to control the velocity of the stream of liquid.

8. A carbonating apparatus as claimed in claim 6 in which said passageway through said nozzle assembly is positioned in said nozzle head.

9. A carbonating apparatus as claimed in claim 8 in which the end of said passageway opening to the restricted passage is a groove circumscribing the conical surface of said nozzle body and in which the end of said passageway opening to the interior of the tank includes a plurality of passages commuicating with said groove.

References Cited

UNITED STATES PATENTS

| | | |
|---|---|---|
| 580,450 | 4/1897 | Champ. |
| 724,727 | 4/1903 | Murphy. |
| 761,434 | 5/1904 | Young. |
| 1,929,948 | 10/1933 | Kantor. |
| 2,339,640 | 1/1944 | Holinger. |
| 2,519,533 | 8/1950 | Arnett. |
| 3,225,965 | 12/1965 | Jacobs et al. |

FOREIGN PATENTS

| | | |
|---|---|---|
| 102,718 | 12/1937 | Australia. |

TIM R. MILES, Primary Examiner

U.S. Cl. X.R.

261—115